Patented Apr. 20, 1954

2,676,130

UNITED STATES PATENT OFFICE 2,676,130

INSECTICIDAL 1,2,5,6-TETRAHYDRO-2,5-METHANO - 2,3,4,5,7,7 - HEXACHLOROBENZYL ALLYL SULFIDE

Alexander Winterstein, Chicago, Ill., assignor to Arvey Corporation, a corporation of Illinois No Drawing. Application November 25, 1952, Serial No. 322,549

2 Claims. (Cl. 167—30)

This invention relates to a new thio ether of a polycyclic halogenated material. More specifically, this invention relates to a new composition of matter which is valuable as an insecticide and more particularly as an aphicide. The new product of the present invention is named 1,2,5,6-tetrahydro - 2,5 - methano - 2,3,4,5,7,7 - hexachlorobenzyl allyl sulfide.

Generally, halogenated organic insecticides, while exhibiting insecticidal activity toward a wide variety of insect pests, are deficient in their ability to adequately control *Aphis gossypii* (commonly known as cotton aphid). Typifying such organic insecticides which are unable to control the cotton aphid is DDT which, rather than controlling this insect pest preferentially kills the predators thereof, thereby creating a situation which enhances the growth and multiplication of the injurious aphid. The resistance of the cotton aphid to insecticides and the ability of such insecticides to kill beneficial insects which prey on the destructive aphid makes it increasingly important to develop new insecticides which will control the aphid equally with or preferentially over other insects. This is especially true in view of recent reports describing increased resistance of insects including cotton aphids to known insecticides.

It is therefore an important object of the present invention to prepare an insecticidal compound exhibiting superior toxicity toward *Aphis gossypii*, as well as toward other destructive insect pests. A 100% kill of *Aphis gossypii* was obtained when a heavy infestation thereof was allowed to feed on leaves which had been treated with the compound of the present invention at concentrations as low as 0.5%. On the other hand, it has been reported that it proved impossible to obtain more than 40% mortality by the use of DDT dusts.

1,2,5,6 - tetrahydro - 2,5 - methano - 2,3,4,5,7,7-hexachlorobenzyl allyl sulfide may be prepared by reacting hexachlorocyclopentadiene with diallyl sulfide to form a 1:1 Diels-Alder adduct of said reactants.

Since the product is a 1:1 adduct, an equal molar ratio of reactants or a molar excess of the sulfide reactant is preferred. While an excess of hexachlorocyclopentadiene may also be used to result in the present product, such an excess of the chlorinated reactant would tend to enhance the formation of a 2:1 adduct, which for the present purpose is not preferred.

The reaction may be carried out at temperatures below the decomposition temperature of the reactants. Since diallyl sulfide is a liquid boiling at 140° C., reaction temperatures of 140° C. or less are preferred so as to avoid the necessity for using a pressure vessel or a high boiling solvent. The reaction proceeds at a reasonable rate at temperatures above about 80° C. If the reaction is run at a temperature at or near the boiling point of the sulfide reactant, means for reflux should be utilized to prevent the sulfide reactant from boiling away. Reflux conditions are desirable in that temperature control is thereby facilitated.

While the reaction may be carried out in the absence of additional solvent, such inert solvent may be used if desired. A solvent may be desired when effecting the reaction at a temperature below 140° C. so that by choosing an appropriate solvent, reflux conditions can be maintained below 140° C. In general, a solvent for the reaction is not preferred since it does not increase the rate of reaction and must be removed from the product after reaction.

Pressure is not a critical factor and normal atmospheric pressures are generally used. Superatmospheric pressures can also be used if desired.

The rate of reaction will of course vary with temperature. Extended reaction periods are not harmful; however, the reaction will generally be completed in one to two hours. Lesser reaction periods may only result in incomplete utilization of the reactants. However, desired product will still be formed. If a molar excess of hexachlorocyclopentadiene is used, extended reaction periods are undesirable since the formation of 2:1 adduct may be enhanced.

It is generally preferred to add the hexachlorocyclopentadiene to the sulfide reactant in a portionwise manner so that regardless of what molar ratio of reactants is ultimately used, a molar excess of the sulfide reactant will be present during the course of the reaction. This factor is, however, not critical, and the sulfide reactant can be added to hexachlorocyclopentadiene as shown in the following example to result in the desired product.

EXAMPLE

*Preparation of 1,2,5,6-tetrahydro-2,5-methano-2,3,4,5,7,7-hexachlorobenzyl allyl sulfide*

Hexachlorocyclopentadiene (136.34 grams; 0.5 mole) was placed in a 3-necked flask equipped with a reflux condenser, stirrer and separatory funnel and heated to about 130° C. Diallyl sulfide (57.10 grams; 0.5 mole) was added dropwise with stirring at such a rate as to maintain the temperature at about 130° C. When the sulfide had been completely added the mixture was heated to 160° C. and maintained at that temperature for about one hour and then cooled to room temperature. The reaction mixture was distilled under vacuum. The distillate was refractionated and the desired product was collected at a temperature of 144–145° C. at a pressure of 0.3 mm. mercury and had the following analysis:

|  | C, percent | H, percent | Cl, percent |
|---|---|---|---|
| Found for product | 34.23 | 2.70 | 55.00 |
| Calculated for $C_{11}H_{10}Cl_6S$ | 34.14 | 2.60 | 54.97 |

The following table exemplifies the ability of the present compound to kill cotton aphids and control these destructive pests. Blue Hubbard squash leaves were dipped into wettable powder suspensions of the toxicant and dried for three hours. Concentration is given in pounds of active material per 100 gallons of water. The thus treated leaves were heavily infested with aphids for each test.

| Concentration | Percent mortality |
|---|---|
| 1 | 50 |
| 4 | 100 |

The product of the present invention, in addition to being a superior aphicide, also has general insecticidal activity and can be utilized against a variety of insects. It can be used either as the sole active ingredient or in combination with other insecticides. It can be effectively utilized in combination with other insecticides which are usually deficient in their ability to control aphids.

The present compound can be applied when admixed with either solid or liquid carriers and adjuvants and can be formulated as wettable powder, aqueous emulsion, oil solution, dust, fog, bait, aerosol, or other means known to the art.

I claim as my invention:

1. As a new composition of matter 1,2,5,6-tetrahydro-2,5-methano- 2,3,4,5,7,7 - hexachlorobenzyl allyl sulfide.

2. The method for controlling *Aphis gossypii* infestations which comprises applying to said insect and its habitats 1,2,5,6-tetrahydro-2,5-methano-2,3,4,5,7,7-hexachlorobenzyl allyl sulfide.

No references cited.